US008234642B2

(12) United States Patent
Slegel et al.

(10) Patent No.: US 8,234,642 B2
(45) Date of Patent: *Jul. 31, 2012

(54) FILTERING PROCESSOR REQUESTS BASED ON IDENTIFIERS

(75) Inventors: Timothy J. Slegel, Staatsburg, NY (US);
Lisa C. Heller, Rhinebeck, NY (US);
Erwin F. Pfeffer, Wuerttemberg (DE);
Ute Gaertner, Baden-Wuerttemberg (DE)

(73) Assignee: International Business Machines Corporation, Armonk, NY (US)

( * ) Notice: Subject to any disclaimer, the term of this patent is extended or adjusted under 35 U.S.C. 154(b) by 515 days.

This patent is subject to a terminal disclaimer.

(21) Appl. No.: 12/434,184

(22) Filed: May 1, 2009

(65) Prior Publication Data

US 2009/0240908 A1    Sep. 24, 2009

Related U.S. Application Data

(63) Continuation of application No. 10/436,361, filed on May 12, 2003, now Pat. No. 7,530,067.

(51) Int. Cl.
*G06F 9/46* (2006.01)
*G06F 9/34* (2006.01)
(52) U.S. Cl. ......... 718/100; 718/102; 711/206; 711/207
(58) Field of Classification Search .................. None
See application file for complete search history.

(56) References Cited

U.S. PATENT DOCUMENTS

| | | | | |
|---|---|---|---|---|
| 4,432,053 A | | 2/1984 | Gaither et al. ................ 364/200 |
| 5,307,495 A | * | 4/1994 | Seino et al. .................... 718/106 |
| 5,307,502 A | | 4/1994 | Watanabe et al. ............. 395/800 |
| 5,317,705 A | | 5/1994 | Gannon et al. ................ 395/400 |
| 5,317,710 A | | 5/1994 | Ara et al. ....................... 395/435 |
| 5,423,014 A | | 6/1995 | Hinton et al. ..................... 711/3 |
| 5,459,872 A | | 10/1995 | Connell et al. ................ 710/263 |
| 5,471,593 A | | 11/1995 | Branigin ........................ 395/375 |
| 5,500,948 A | | 3/1996 | Hinton et al. ................. 711/205 |
| 5,530,891 A | | 6/1996 | Gephardt .......................... 710/8 |
| 5,555,394 A | | 9/1996 | Arakawa et al. .............. 395/462 |
| 5,555,430 A | | 9/1996 | Gephardt et al. ............... 712/16 |
| 5,564,060 A | | 10/1996 | Mahalingaiah et al. ........ 710/51 |
| 5,568,649 A | | 10/1996 | MacDonald et al. ........... 710/48 |
| 5,574,878 A | * | 11/1996 | Onodera et al. ............... 711/207 |
| 5,584,042 A | * | 12/1996 | Cormier et al. ................ 710/36 |
| 5,613,126 A | | 3/1997 | Schmidt ........................ 710/260 |

(Continued)

OTHER PUBLICATIONS

"IBM System/370 Extended Architecture," IBM Publication No. SA22-7095-1, Second Edition, Sep. 1985.

(Continued)

*Primary Examiner* — Thomas Lee
*Assistant Examiner* — Caroline H Arcos
(74) *Attorney, Agent, or Firm* — John E. Campbell; Blanche E. Schiller, Esq.; Heslin Rothenberg Farley & Mesiti P.C.

(57) ABSTRACT

Processing within a computing environment is facilitated by filtering requests of the computing environment. A processing unit that receives a request determines whether it is to perform the request. This determination is made by, for instance, comparing an identifier of the request with an identifier of the processing unit making the determination. If there is a mismatch, then the request is blocked. Other processing within the computing environment is also facilitated by selectively using buffer entries. The selection criteria is based, for instance, on identifier information.

23 Claims, 11 Drawing Sheets

U.S. PATENT DOCUMENTS

| | | | | |
|---|---|---|---|---|
| 5,615,327 | A | | 3/1997 | Magee et al. .................... 714/12 |
| 5,687,343 | A | * | 11/1997 | Fecteau et al. ................. 711/202 |
| 5,737,575 | A | | 4/1998 | Blaner .......................... 711/164 |
| 5,761,734 | A | | 6/1998 | Pfeffer et al. ................. 711/164 |
| 5,771,365 | A | | 6/1998 | McMahan et al. ............ 395/381 |
| 5,781,187 | A | | 7/1998 | Gephardt et al. ............. 710/309 |
| 5,928,353 | A | | 7/1999 | Yamada ........................ 712/200 |
| 5,946,717 | A | | 8/1999 | Uchibori ....................... 711/207 |
| 6,079,013 | A | | 6/2000 | Webb et al. ................... 712/227 |
| 6,088,792 | A | | 7/2000 | Slegel et al. .................. 712/228 |
| 6,119,204 | A | | 9/2000 | Chang et al. .................. 711/141 |
| 6,119,219 | A | | 9/2000 | Webb et al. ................... 712/227 |
| 6,260,130 | B1 | | 7/2001 | Liedtke ......................... 711/206 |
| 6,311,204 | B1 | * | 10/2001 | Mills ............................. 718/100 |
| 6,438,671 | B1 | * | 8/2002 | Doing et al. .................. 711/173 |
| 6,594,785 | B1 | * | 7/2003 | Gilbertson et al. ............. 714/48 |
| 6,643,747 | B2 | * | 11/2003 | Hammarlund et al. ....... 711/151 |
| 6,658,591 | B1 | * | 12/2003 | Arndt .......................... 714/6.11 |
| 6,665,759 | B2 | * | 12/2003 | Dawkins et al. ............. 710/200 |
| 6,725,284 | B2 | * | 4/2004 | Arndt .............................. 710/5 |
| 6,829,684 | B2 | * | 12/2004 | Doing et al. .................. 711/152 |
| 6,892,383 | B1 | * | 5/2005 | Arndt ............................... 718/1 |
| 6,957,435 | B2 | * | 10/2005 | Armstrong et al. ........... 718/104 |
| 6,996,698 | B2 | | 2/2006 | Slegel et al. .................. 711/220 |
| 7,020,761 | B2 | | 3/2006 | Siegel et al. .................. 711/202 |
| 7,047,337 | B2 | * | 5/2006 | Armstrong et al. ........... 710/200 |
| 7,103,626 | B1 | * | 9/2006 | Recio et al. ................... 709/201 |
| 7,284,100 | B2 | | 10/2007 | Slegel et al. .................. 711/156 |
| 2003/0009648 | A1 | * | 1/2003 | Doing et al. .................. 711/202 |
| 2003/0115476 | A1 | * | 6/2003 | McKee ......................... 713/193 |
| 2003/0204648 | A1 | | 10/2003 | Arndt ................................ 710/5 |
| 2004/0117532 | A1 | * | 6/2004 | Bennett et al. ................ 710/260 |
| 2004/0194097 | A1 | * | 9/2004 | Spencer ........................ 718/100 |
| 2004/0230768 | A1 | * | 11/2004 | Slegel et al. .................. 711/206 |

OTHER PUBLICATIONS

"z/Architecture—Principles of Operation," IBM Publication No. SA22-7832-00, Dec. 2000, Chapter 3, pp. 9-10 and 27-49; Chapter 10, pp. 18-19, 29-30 and 91.

Office Action received from the U.S. Appl. No. 10/436,361, mailed Jan. 25, 2008.

Final Office Action received from the U.S. Appl. No. 10/436,361, mailed Aug. 1, 2008.

* cited by examiner

FILTERING PROCESSOR REQUESTS BASED ON IDENTIFIERS

This application is a continuation of co-pending U.S. patent application Ser. No. 10/436,361, filed May 12, 2003, entitled "Filtering Processor Requests Based on Identifiers," the entirety of which is hereby incorporated herein by reference.

TECHNICAL FIELD

This invention relates, in general, to processing within a computing environment, and in particular, to filtering requests by one or more processors of the computing environment.

BACKGROUND OF THE INVENTION

The processing of a request by one processor may affect one or more other processors of the environment. For example, in a Symmetric Multiprocessor System (SMP) based on the z/Architecture of International Business Machines Corporation, Armonk, N.Y., various broadcast purge operations, such as Invalidate Page Table Entry (IPTE), Set Storage Key Extended (SSKE), and Compare and Swap and Purge (CSP) instructions, require entries of one or more buffers (e.g., Translation Lookaside Buffers (TLBs)) to be removed from the buffers in all processors of the environment. Furthermore, the architecture requires the buffers to be purged atomically, such that no processor can observe a new TLB entry, while some other processor observes an old entry. Many other computer architectures also provide a similar mechanism.

One common implementation for the broadcast purge operation includes the following: 1) all processors are quiesced (i.e., most normal processing operations are suspended, including accessing the TLB); 2) TLBs on all processors are purged of the appropriate entries; 3) the common resource is changed (a page table entry in storage for IPTE or a storage key for SSKE); and 4) finally, the quiesce is released and the processors continue their normal activities. Obviously, this implementation could have a major performance impact, especially for large SMP configurations, since all processors must be quiesced for the duration of the operation. In particular, it is common that one processor is executing some long running instruction that is not interruptible, so it cannot reach the quiesce state for some time. Thus, all other processors are required to wait for this last processor to reach the quiesce state before the steps described above can be completed.

Some strides have been made in the above processing to enhance performance. For example, in U.S. Pat. No. 6,119,219, entitled "System Serialization With Early Release Of Individual Processor," Webb et al., Sep. 12, 2000, and U.S. Pat. No. 6,079,013, entitled "Multiprocessor Serialization With Early Release of Processors," Webb et al., Jun. 20, 2000, each of which is hereby incorporated herein by reference in its entirety, a technique is described in which processors are potentially quiesced for a shorter period of time. For example, when a processor receives a request, it immediately quiesces and then purges the appropriate entries in its own TLB. After the purge is complete, this processor is allowed to continue processing subject to various restrictions. One of these restrictions includes that if the processor misses in its TLB, it is not permitted to perform address translation or fetch a storage key, but instead must stall until the quiesce is released. Only after the quiesce is released are all restrictions removed from the processors.

Thus, although attempts have been made to reduce the amount of time processors are stalled, enhancements are still needed. For example, a need exists for a capability that enables filtering of processor requests, such that a request may be blocked by a processor when, for instance, the processor is not affected by the request. A further need exists for an improved technique to purge buffer entries.

SUMMARY OF THE INVENTION

The shortcomings of the prior art are overcome and additional advantages are provided through the provision of a computer program product for processing requests of a logically partitioned computer system including a plurality of logical partitions. The computer program product includes, for instance, a storage medium readable by a processor and storing instructions for execution by the processor for performing a method including, for instance, obtaining by a receiving processing unit of the logically partitioned computer system a request of a sending processing unit of the logically partitioned computer system, the sending processing unit being associated with one logical partition of the logically partitioned computer system and the request including a logical partition identifier of the one logical partition, and the receiving processing unit being in the one logical partition or another logical partition of the logically partitioned computer system; determining whether the request is to be blocked by the receiving processing unit, wherein the determining includes comparing the logical partition identifier of the request with a logical partition identifier of the receiving processing unit; and blocking processing of the request by the receiving processing unit, in response to the comparing indicating a mismatch between the logical partition identifier of the request and the logical partition identifier of the receiving processing unit, wherein a mismatch indicates that the sending processing unit and the receiving processing unit are in different logical partitions, and wherein the blocking comprises indicating by the receiving processing unit that it has reached a processing point associated with the request even though the receiving processing unit does not perform the request.

Further, a computer program product for processing requests of a logically partitioned computer system comprising a plurality of logical partitions is provided. The computer program product includes, for instance, a storage medium readable by a processor and storing instructions for execution by the processor for performing a method including, for instance, obtaining, by a receiving processing unit of the logically partitioned computer system, a purge request to purge at least one entry of a translation lookaside buffer, the purge request including a specified logical partition identifier, and wherein the translation lookaside buffer comprises a plurality of entries, each entry including a logical partition identifier, wherein the logical partition identifier in one entry of the translation lookaside buffer may be the same or different from the logical partition identifier in another entry of the translation lookaside buffer; determining which entries of the translation lookaside buffer have a logical partition identifier equal to the specified logical partition identifier of the request; and purging, by the receiving processing unit, the entries of the translation lookaside buffer having a logical partition identifier equal to the specified logical partition identifier, wherein, in response to the purging, an entry is not purged but remains in the translation lookaside buffer because of a mismatch of the specified logical partition identifier and the logical partition identifier of the entry.

System and methods corresponding to the above-summarized computer program products are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a filtering capability is provided that enables requests to be filtered by processing units (e.g., processors). As one example, the filtering is based upon an identifier of the request. If an identifier of the request does not match the identifier of a processor, in one instance, then the processor does not perform the request (i.e., blocks the request).

Figure 1:
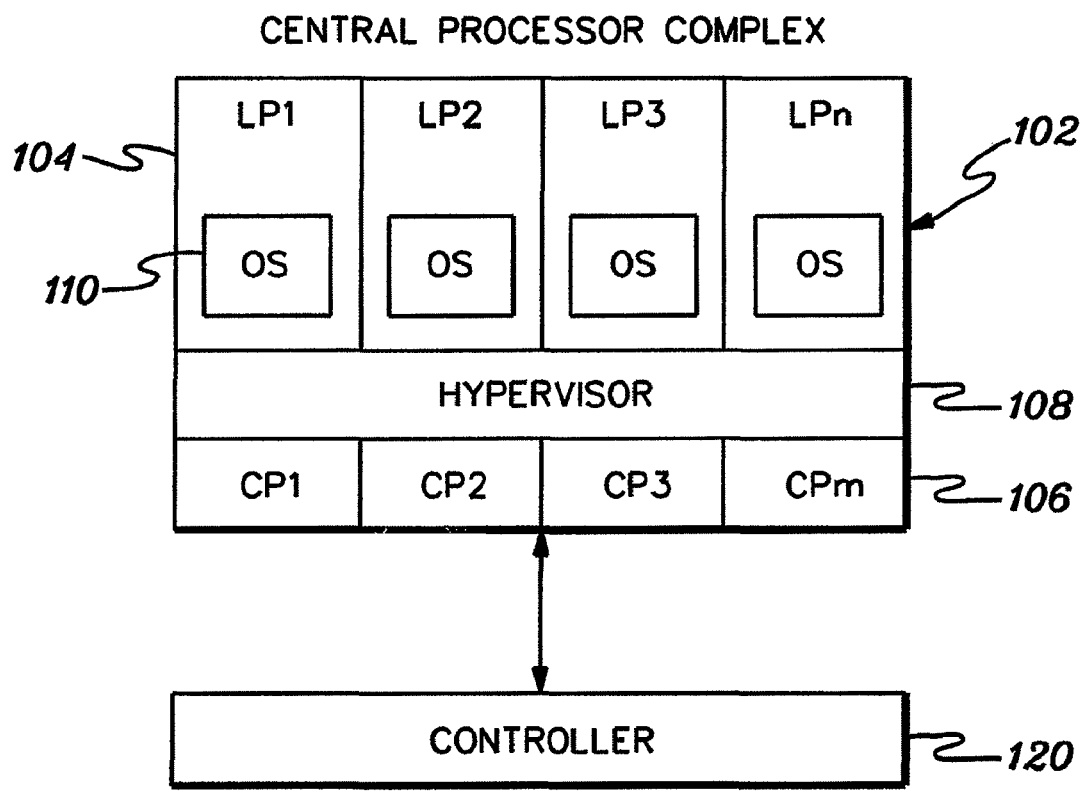
FIG. 1 depicts one embodiment of a computing environment incorporating and using one or more aspects of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer zSeries offered by International Business Machines Corporation, Armonk, N.Y.

As one example, computing environment 100 includes a central processor complex (CPC) 102 coupled to a controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete computer system, but in reality, only a portion of it is available. A combination of hardware and Licensed Internal Code (commonly referred to as microcode) keeps a program in a logical partition from interfering with a program in a different logical partition. This allows several different logical partitions to operate on a single physical processor in a time sliced manner. In this particular example, each logical partition has a resident operating system 110, which may differ for one or more logical partitions. In one embodiment, operating system 110 is the z/OS operating system offered by International Business Machines Corporation, Armonk, N.Y.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors; it broadcasts messages; and otherwise, handles requests. One example of a controller is described in U.S. Pat. No. 6,119,219, entitled "System Serialization With Early Release Of Individual Processor," Webb et al., Sep. 12, 2000, which is hereby incorporated herein by reference in its entirety. Further details are also described with reference to FIG. 2.

Figure 2:
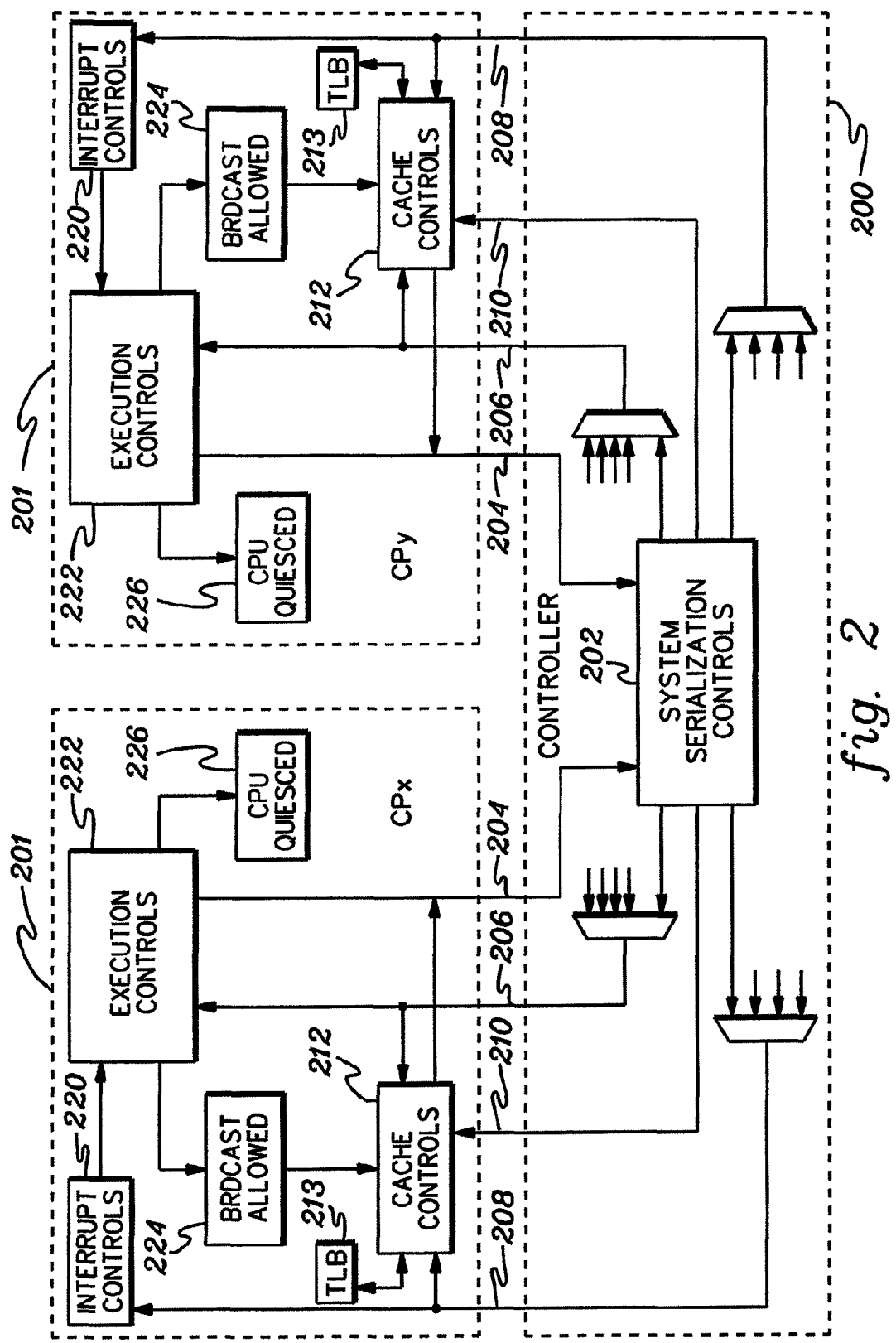
FIG. 2 depicts one embodiment of further details associated with a controller of FIG. 1, in accordance with an aspect of the present invention.

FIG. 2 depicts one example of a controller 200 coupled to a plurality of central processors (CPUs) 201. In this example, only two central processors are depicted. However, it will be understood that more than two processors may be coupled to controller 200.

Controller 200 includes various controls including, for instance, system serialization controls 202. The system serialization controls are used to insure that operations that are to be serialized, such as Invalidate Page Table Entry (IPTE), Set Storage Key Extended (SSKE), or Compare and Swap and Purge (CSP and CSPG) instructions, are serialized, such that only one such instruction is in progress at one time in the computing environment. It also monitors the sequence of events for that operation.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213, described in further detail below.

In addition to cache controls 212, central processor 201 includes various other controls, including, for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, execution controls 222 invokes a Licensed Internal Code routine to set a broadcast operation allowed latch 224 to enable cache controls 212 to process pending commands.

Central processor 201 also includes a CPU quiesced latch 226 that indicates whether or not the central processor is quiesced.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others. Moreover, an environment may include an emulator (e.g., software or other emulation mechanisms), in which a particular architecture or a subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In environments in which resources are shared, such as in a logically partitioned environment, the processing of one processor of the environment may affect one or more other processors of the environment. For instance, the execution of a particular instruction by one processor may cause operations to be performed on other processors of the environment. There are situations, however, when one or more of the processors need not be affected by the processing. Therefore, in accordance with an aspect of the present invention, a processor may filter a request that it receives, and block that request, if desired. As one example, the filtering is based on an identifier of the request. That is, if the identifier of the request is different from an identifier of a processor, then that processor need not perform the request. This is described in further detail with reference to FIGS. 3a-3b.

Figure 3A:
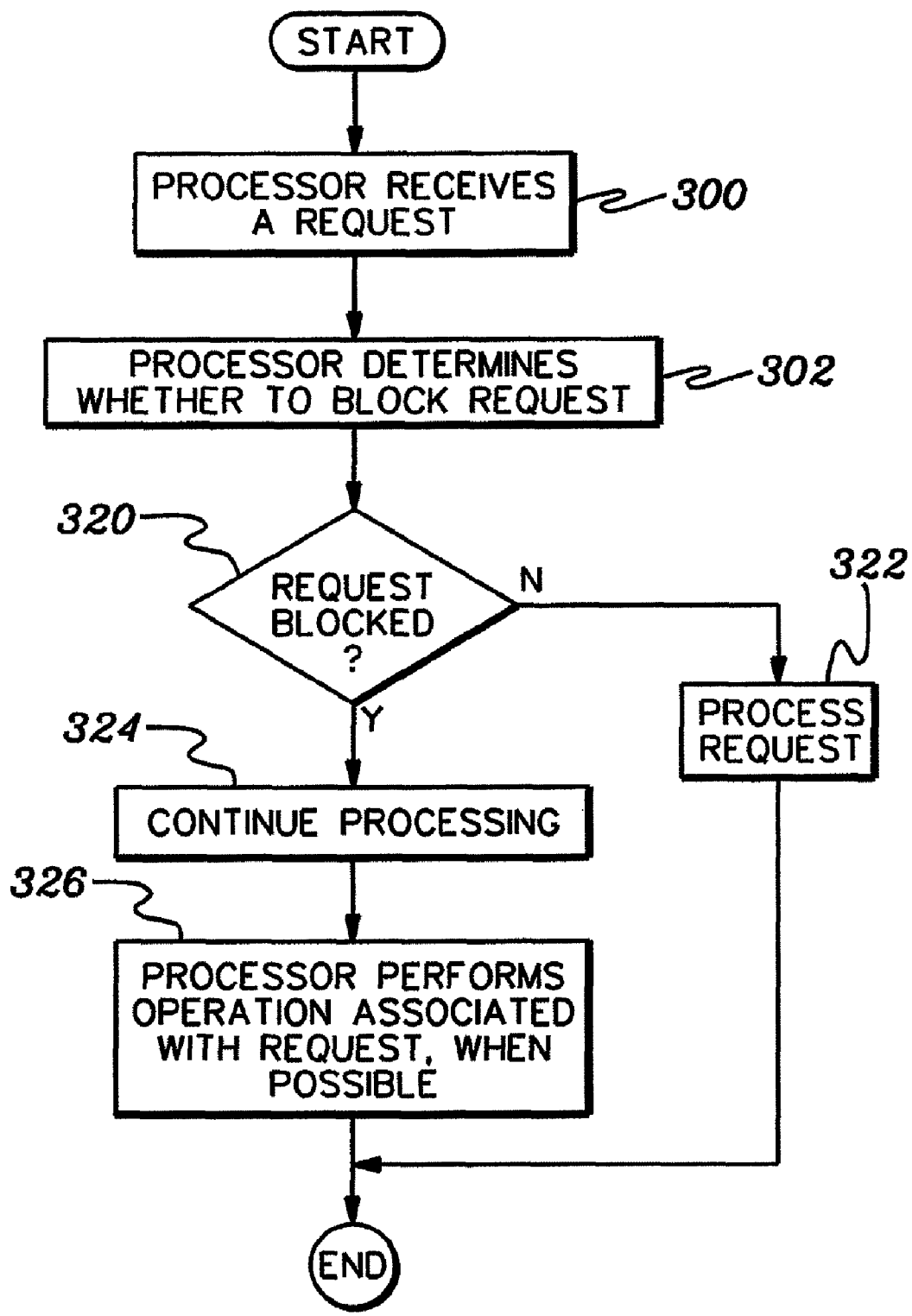
FIGS. 3a-3b depict one embodiment of the logic associated with blocking a request, in accordance with an aspect of the present invention.
Figure 3B:
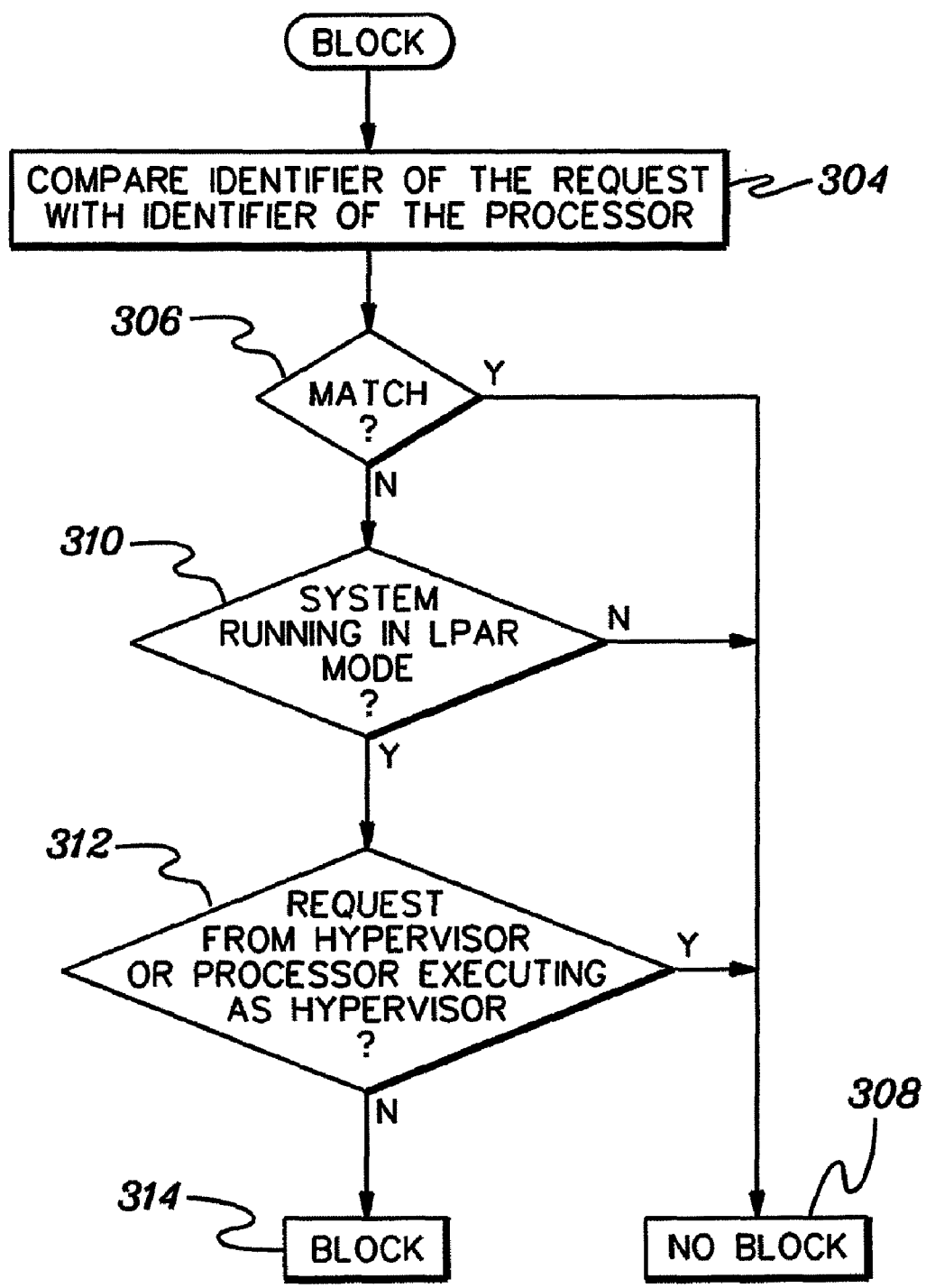

Referring to FIG. 3a, initially, a processor receives a request, STEP 300. In response to receiving that request, the processor determines whether to block the request, STEP 302. One embodiment of the logic associated with blocking a request is described with reference to FIG. 3b.

An identifier of the request is compared with an identifier of the processor, STEP 304. For instance, the logical partition identifier of the processor issuing the request is placed in the request (e.g., as part of the command) and that logical partition identifier is compared with the logical partition identifier of the processor receiving the request. In one example, this comparison is performed by the interrupt controls of the processor. If the identifiers match, INQUIRY 306, then the request is not blocked, STEP 308. However, if the identifiers do not match, then in this particular example, further inquiries are made. For instance, a determination is made as to whether the system is running in logical partitioned mode, INQUIRY 310. If the system is not running in logical partitioned mode, then the request is not blocked, STEP 308. However, if the system is running in logical partitioned mode, then a further determination is made as to whether the sending or receiving requests are from the logical partition hypervisor or whether the processor is executing as a hypervisor (i.e., not for a partition), INQUIRY 312. Should the requests be from the hypervisor or the processor is executing as a hypervisor, then the request is not blocked, STEP 308. However, if the requests are not from the hypervisor and the processor is not executing as a hypervisor, then the request is blocked, STEP 314.

Returning to FIG. 3a, a determination is made as to whether the request is to be blocked, INQUIRY 320. If the request is not blocked, then the processor processes the request in a usual manner, STEP 322. For example, if the request is a quiesce interrupt, then the hardware processes the quiesce interrupt as described in U.S. Pat. No. 6,119,219, entitled "System Serialization With Early Release Of Individual Processor," Webb et al., Sep. 12, 2000, which is hereby incorporated herein by reference in its entirety.

Returning to INQUIRY 320, should the request be blocked, then the processor continues normal processing, STEP 324. Additionally, in one embodiment, at a later time, the processor performs one or more operations associated with the request, when possible, STEP 326.

As described above, a processor filters its requests, thereby determining whether a request is to be blocked. This processing can be performed for a number of different scenarios. As examples, it can be performed in relation to the execution of instructions that require other processors to perform actions. For instance, broadcast purge operations, such as Invalidate Page Table Entry (IPTE) instructions, Set Storage Key Extended (SSKE) instructions, Compare and Swap and Purge (CSP and CSPG) instructions, or similar instructions, include an atomic purge operation, in which processors are to quiesce and then purge entries from a buffer associated with these instructions. However, in accordance with one or more aspects of the present invention, a processor may be able to block the quiesce request, and thus, continue processing. This increases system performance. Further, it may be able to satisfy the purge request, at a convenient time.

Further details regarding the filtering capability of the present invention is described with reference to FIGS. 4-8. Although 3 processors are depicted, it is understood that any number of processors can be used. These figures reference an Invalidate Page Table Entry instruction, which is being processed in a logical partitioned environment. One example of an Invalidate Page Table Entry instruction is described in an IBM® publication entitled, "z/Architecture Principles of Operation," IBM Publication No. SA22-7832-00, December 2000, which is hereby incorporated herein by reference in its entirety.

The Invalidate Page Table Entry instruction causes one or more processors to purge entries in a buffer relating to the instruction. For instance, each processor has associated therewith one or more buffers, referred to as Translation Lookaside Buffers (TLBs), located in the processor. The Translation Look Aside Buffers are used by a Dynamic Address Translation (DAT) mechanism to enhance performance, when translating virtual addresses to real addresses. That is, some of the information used by the Dynamic Address Translation mechanism is maintained in the buffers for faster access. For example, various information specified in region tables, segment tables and/or page tables are maintained in the buffers.

To purge an entry in a buffer, one or more processors may need to be quiesced, such that data is not corrupted. However, in accordance with an aspect of the present invention, not all processors of the environment need be quiesced. For instance, processors that are in a different logical partition than the requesting processor need not be quiesced. This is described in further detail with reference to the example depicted in FIGS. 4-8.

Figure 4:
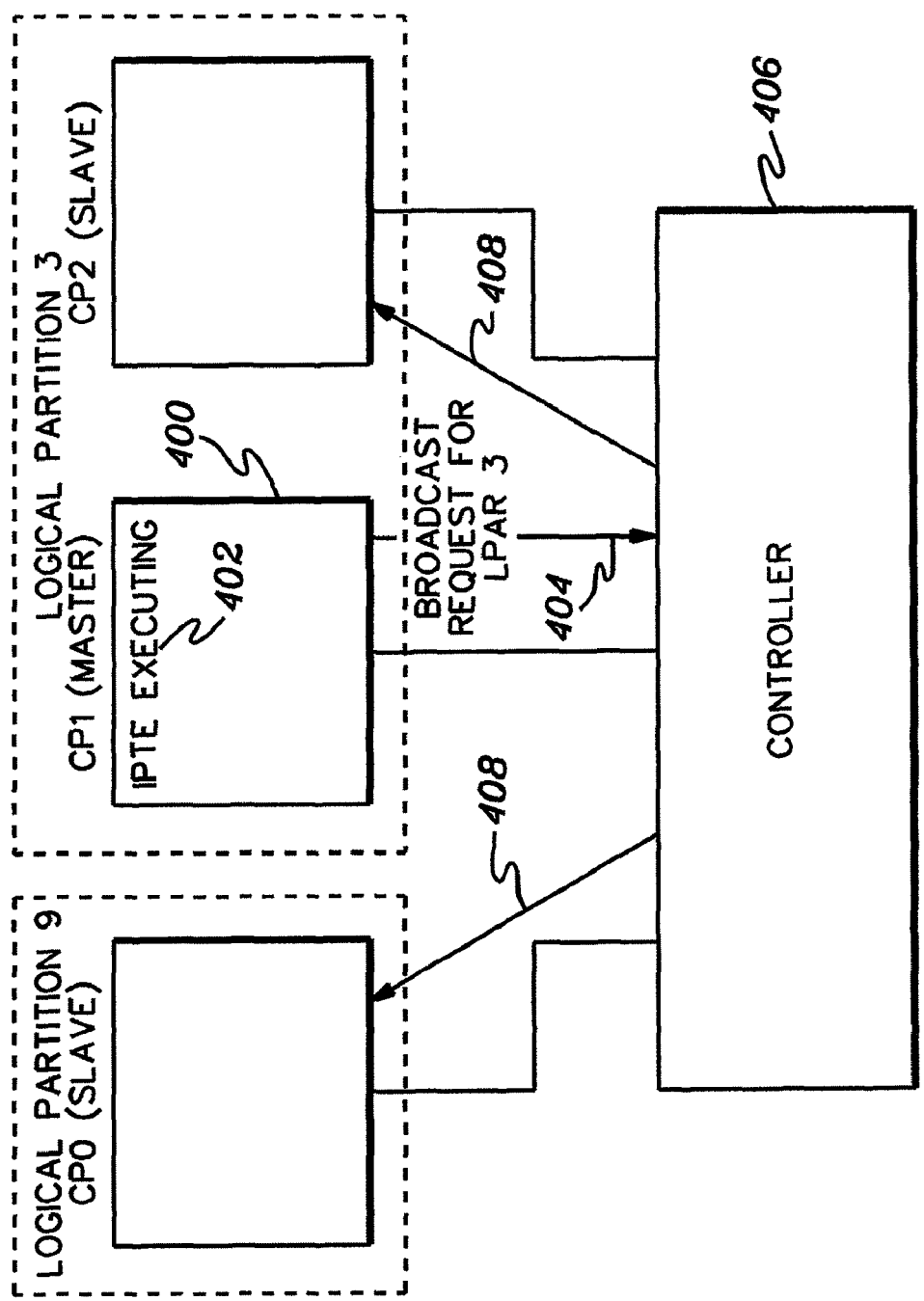
FIG. 4 pictorially depicts one example of a master processor executing an Invalidate Page Table Entry (IPTE) instruction and issuing a broadcast request to a controller, which then forwards the request to slave processors, in accordance with an aspect of the present invention.

Referring to FIG. 4, a processor 400 executing an instruction 402 (e.g., an IPTE instruction) issues a broadcast request 404 (e.g., a quiesce request) as part of processing the instruction. The request is forwarded, in this example, to a controller 406.

The processor issuing the request is referred to herein as the master processor and the other processors are referred to as slave processors. In this particular example, the master processor (CP1) is associated with Logical Partition 3. Another processor (CP2) is also associated with that partition, while a third processor (CP0) is associated with a different logical partition (Logical Partition 9). The processors are coupled to controller 406.

In response to controller 406 receiving a request of a broadcast nature from the master processor, the controller forwards the request (408) to the slave processors. The processors process the request in an appropriate manner, which depends on, for example, information associated with the particular processor, such as its associated logical partition.

Figure 5:
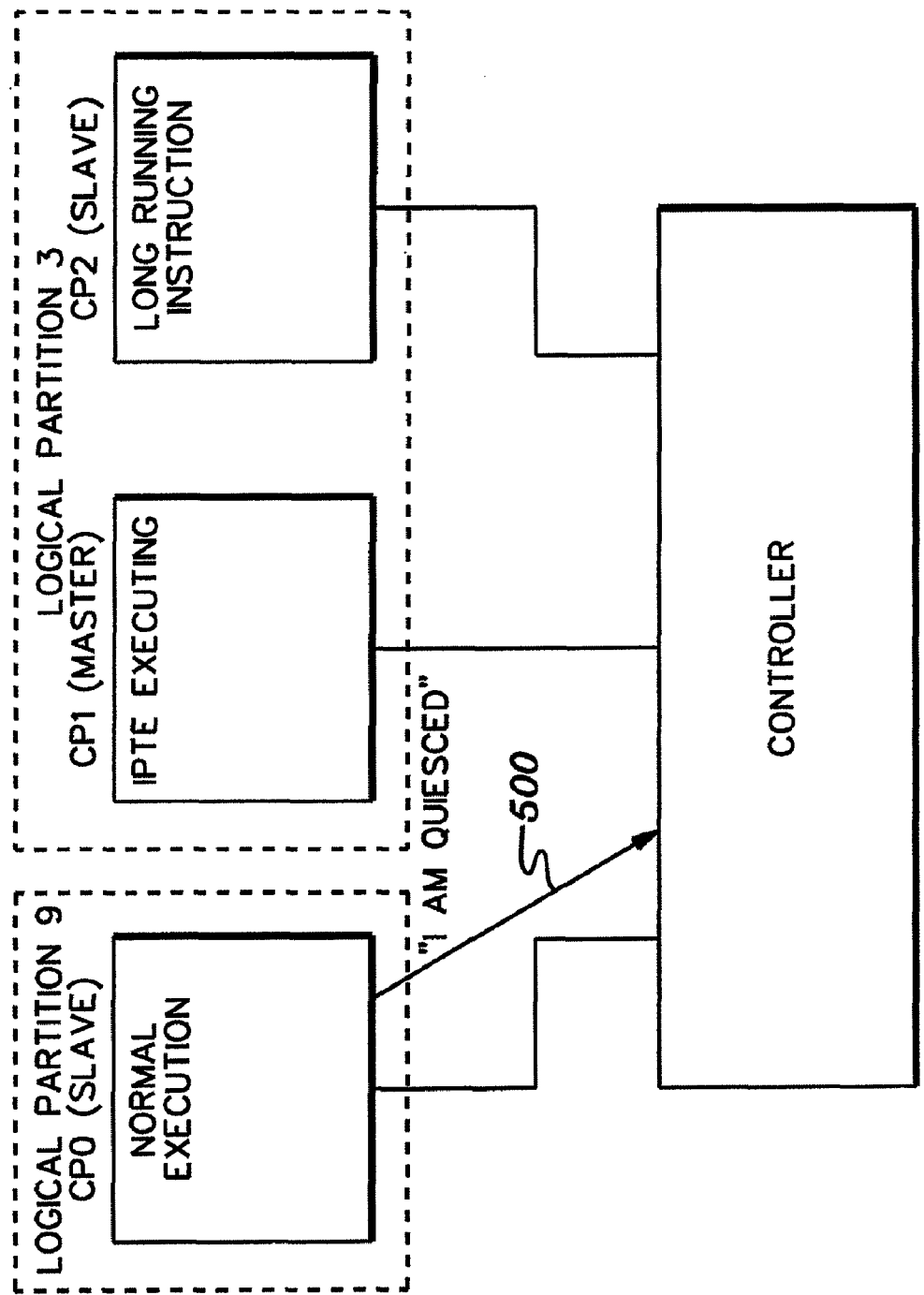
FIG. 5 pictorially depicts one example of a slave processor responding to the request sent by the controller of FIG. 4, in accordance with an aspect of the present invention.

For example, as depicted in FIG. 5, CP0, which is operating in a different logical partition than the master, processes the request by responding to the controller that it has reached a quiesce point (500), even though the processor does not quiesce. CP2, however, handles the request in a different manner, since it is in the same logical partition as the master, and is executing a long running instruction. In this case, CP2 does not respond to the quiesce request at this time and the quiesce request remains pending.

Figure 6:
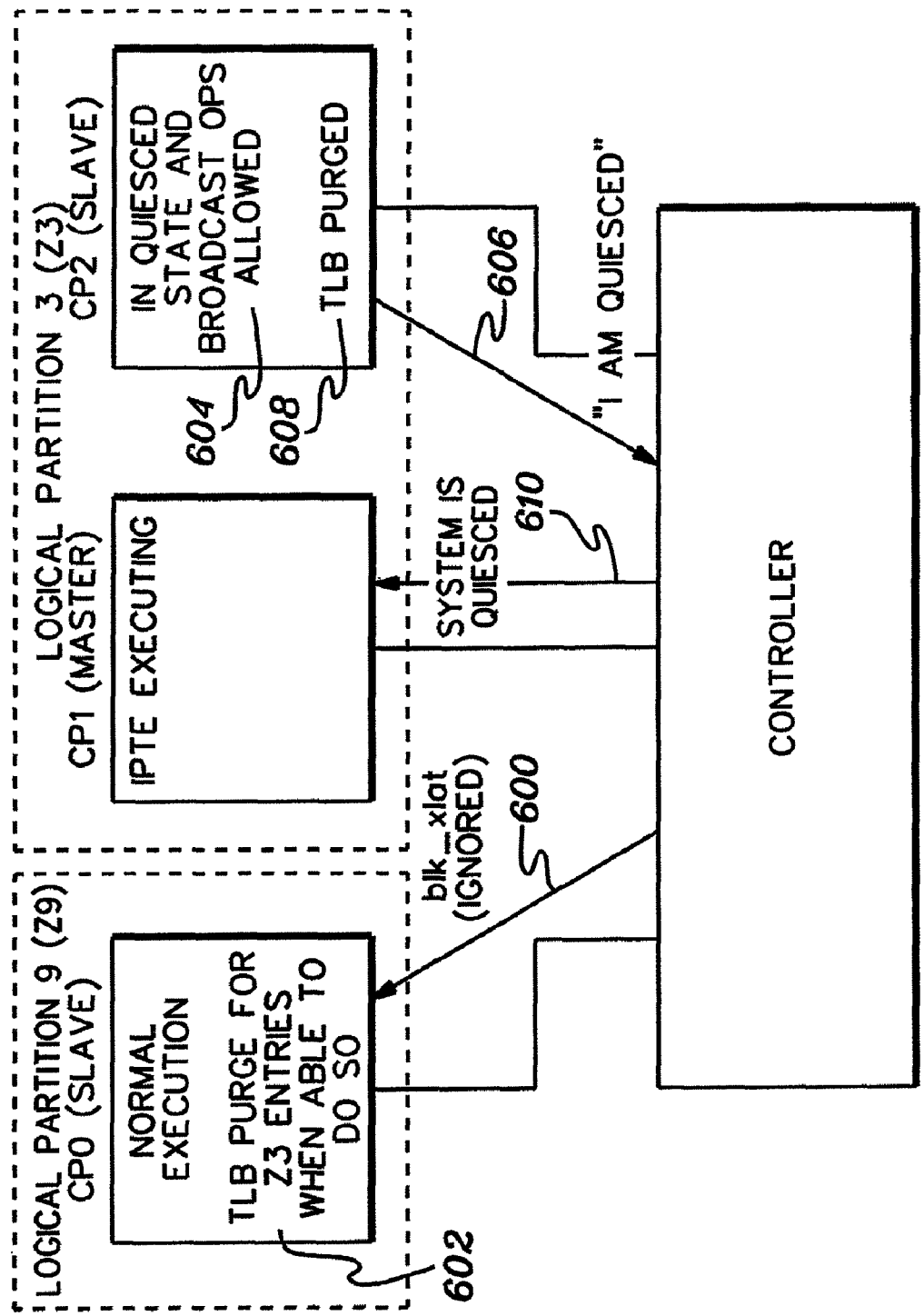
FIG. 6 pictorially depicts one example of further processing being performed by the processors in relation to the Invalidate Page Table Entry instruction, in accordance with an aspect of the present invention.

Since CP0 indicated to the controller that it has reached a quiesce point, in one embodiment, the controller sets a signal for the processor (see FIG. 6). This signal is, for instance, a block translations (blk_xlat) signal (600) indicating that the slave processor is not permitted to continue in the event of a TLB miss. That is, the slave processor is not permitted to perform DAT translations. However, in accordance with an aspect of the present invention, this signal is ignored by CP0, since CP0 is in a different logical partition than the master. Thus, if it misses in its TLB, it is still permitted to perform DAT translations. CP0 simply ignores the quiesce request and any restrictions associated therewith. Further, when it is convenient, CP0 performs an operation associated with the quiesce request, which includes purging entries for Logical Partition 3 from its TLB (602).

Meanwhile, CP2 finishes its long running instruction and is able to take the quiesce interrupt (604). Thus, CP2 responds back to the controller that it is at a quiesce point (606), and purges its TLB of appropriate entries associated with the broadcast IPTE operation for Logical Partition 3 entries (608). The controller responds to the master, CP1, that the last processor in the system has reached the quiesce point and the system is placed in a quiesce state (610).

Figure 7:
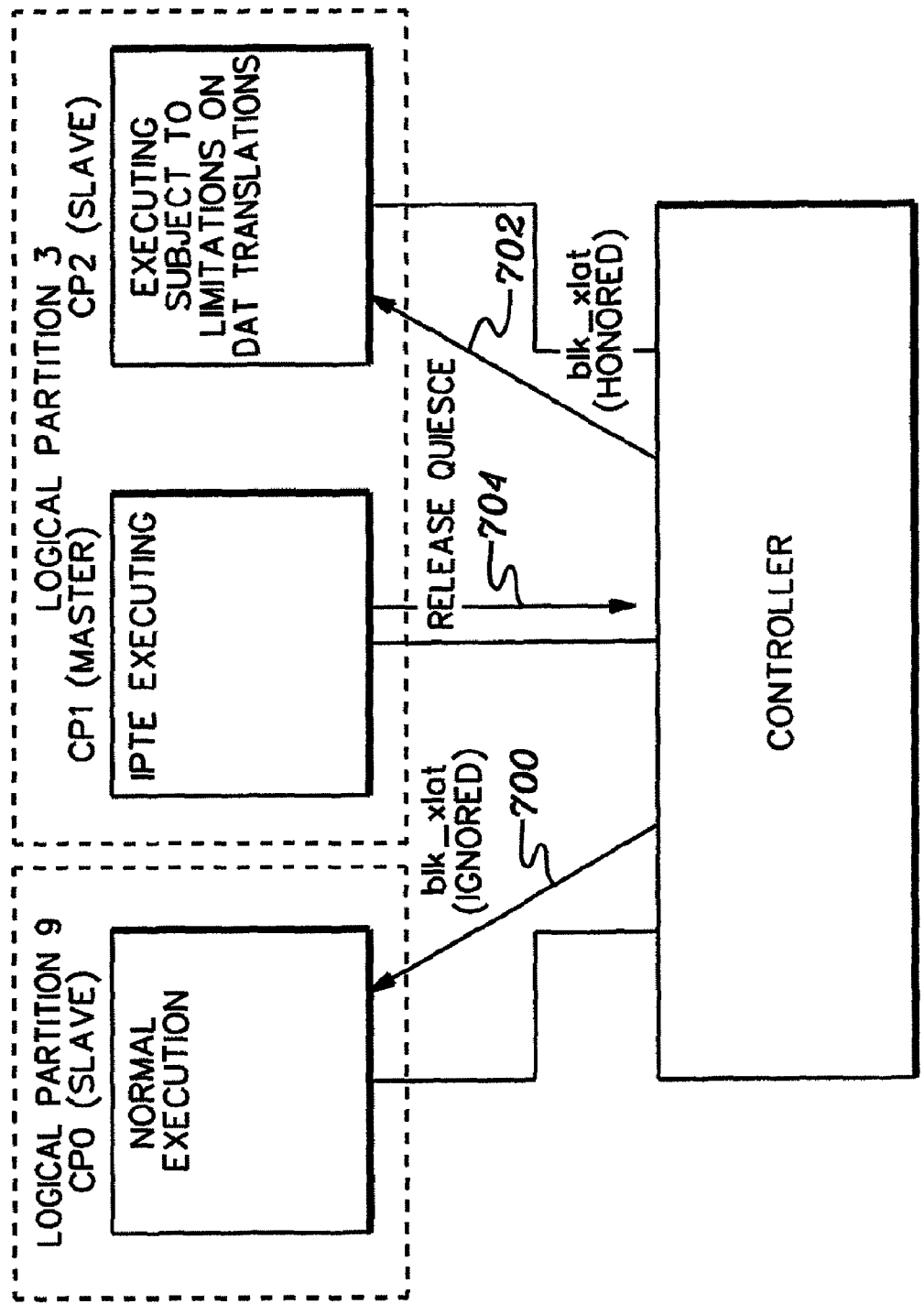
FIG. 7 pictorially depicts the master processor sending a release request to the controller, in accordance with an aspect of the present invention.

Thus, the processors execute, as appropriate. For example, as shown in FIG. 7, CP0 executes instructions normally and ignores the blk_xlat signal (700). If it misses in its TLB, it is still permitted to perform DAT translations that would otherwise be prohibited. CP2 also executes, but it is to honor a blk_xlat signal (702). Thus, although it is still permitted to attempt execution of instructions, if it misses in its TLB, it does not attempt DAT translation and waits until the blk_xlat signal drops. That is, it quiesces. Further, CP1 is now allowed to change the system resource. In this example, that includes turning on the invalid bit in a page table entry in storage. When this is complete, it sends a signal to the controller indicating to release the quiesce (704).

Figure 8:
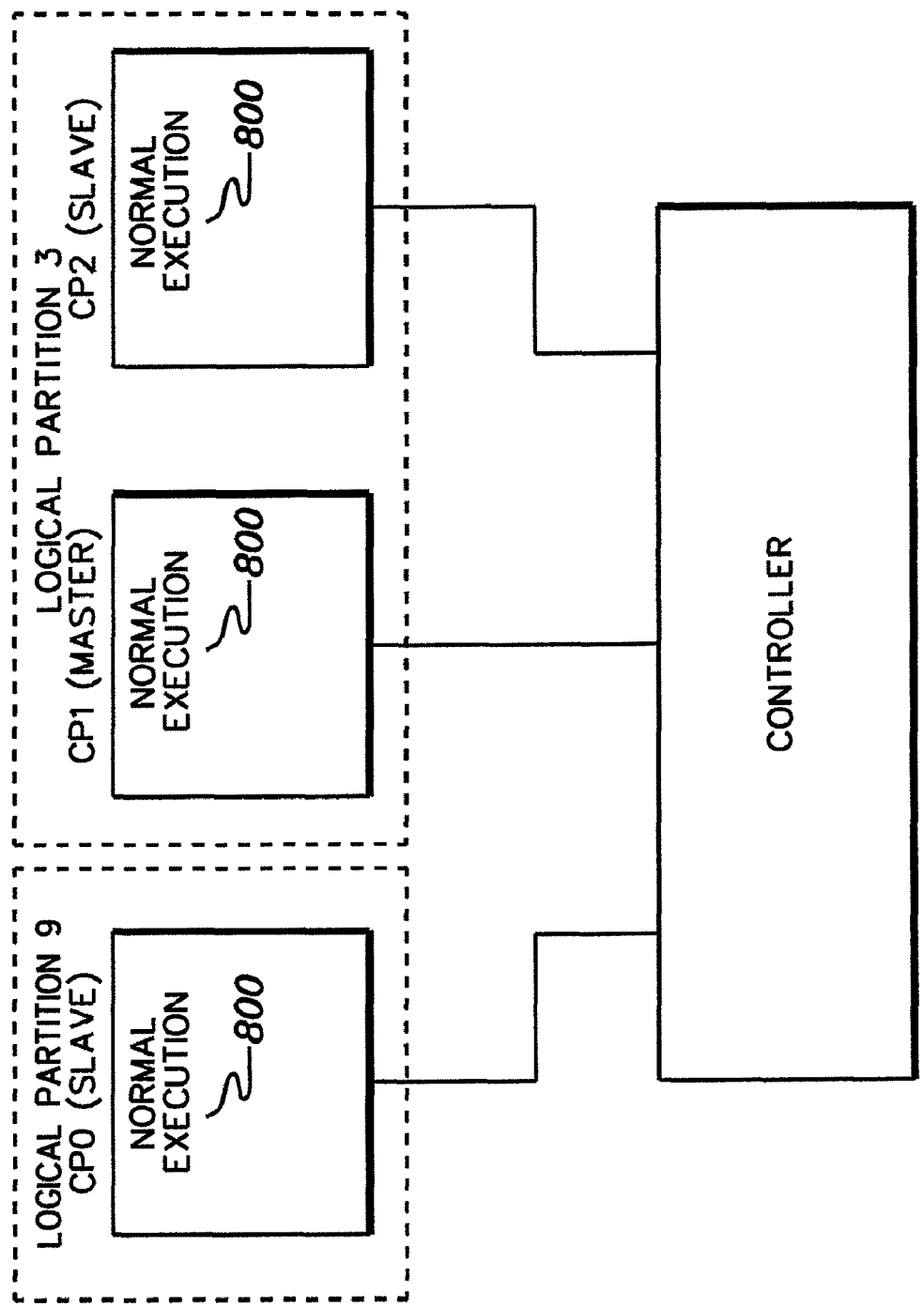
FIG. 8 pictorially depicts normal execution of the processors, since the quiesce has been released, in accordance with an aspect of the present invention.

In response to releasing the quiesce, the processors execute instructions normally with no limitations (800—FIG. 8). The blk_xlat signals that were previously active from the controller are no longer active.

Although the above example is described with reference to an IPTE instruction, one or more aspects of the present invention are applicable to other instructions, such as a Set Storage Key Extended (SSKE) instruction. One example of SSKE instruction is described in an IBM® publication entitled, "z/Architecture Principles of Operation," IBM Publication No. SA22-7832-00, December 2000, which is hereby incorporated herein by reference in its entirety. The Set Storage Key Extended instruction causes one or more processors to purge entries in the TLBs relating to the instruction. The entries to be purged include storage keys, which are associated with blocks of storage. A storage key is used to reference a block of storage.

In one embodiment, processing associated with SSKE, in accordance with one or more aspects of the present invention, includes an additional step, in some circumstances. For instance, if partition filtering occurs, while a physical processor is executing in a logical partition under SIE (the Start Interpretive Execution architecture, one example of which is described in an IBM® publication entitled, "IBM System/370 Extended Architecture," IBM Publication No. SA22-7095 (1985), which is hereby incorporated herein by reference in its entirety) and an SSKE purge is filtered, then on return from the guest back to the host, the hypervisor could observe an inconsistent state of the storage keys. To handle this case, an indicator is set, when an SSKE operation is filtered. This indicator may be set by hardware, software, or firmware. In one example, the indicator includes a latch in hardware, and remembers the state of whether or not an SSKE purge operation has been executed. Then, on SIE exit from a guest back to the host, this indicator is tested. If the indicator is set, then host entries are purged from the TLB. In one example, there are multiple levels of TLBs on a physical processor and only certain level(s) may not have actually been purged, as part of partition filtering. Therefore, this final purge on SIE exit is used for those TLB(s) that have not been purged already.

In addition to the above instructions, one or more aspects of the present invention can be used with many other instructions, including, for instance, a Compare and Swap and Purge (CSP and CSPG) instruction, as well as an instruction referred to as IDTE, which is described in a U.S. Pat. No. 7,284,100, entitled "Invalidating Storage, Clearing Buffer Entries, And An Instruction Therefor," Slegel et al., issued Oct. 16, 2007, which is hereby incorporated herein by reference in its entirety. Other instructions, including those that are similar or equivalent to the above instructions in the same architecture, or different architectures, also can benefit from one or more aspects of the present invention.

Described in detail above is a filtering capability that enables requests to be blocked. That is, those requests and limitations associated therewith are ignored. This advantageously increases system performance. For example, the amount of quiesce stall time is significantly reduced.

In a further aspect of the present invention, system performance is enhanced by selectively purging entries from buffers, such as TLBs. In this aspect, entries are purged depending on a defined criteria, such as, for instance, an identifier. For example, entries are purged that are related to a purge request for a particular logical partition. This is described with reference to FIGS. 9-10.

Figure 9:
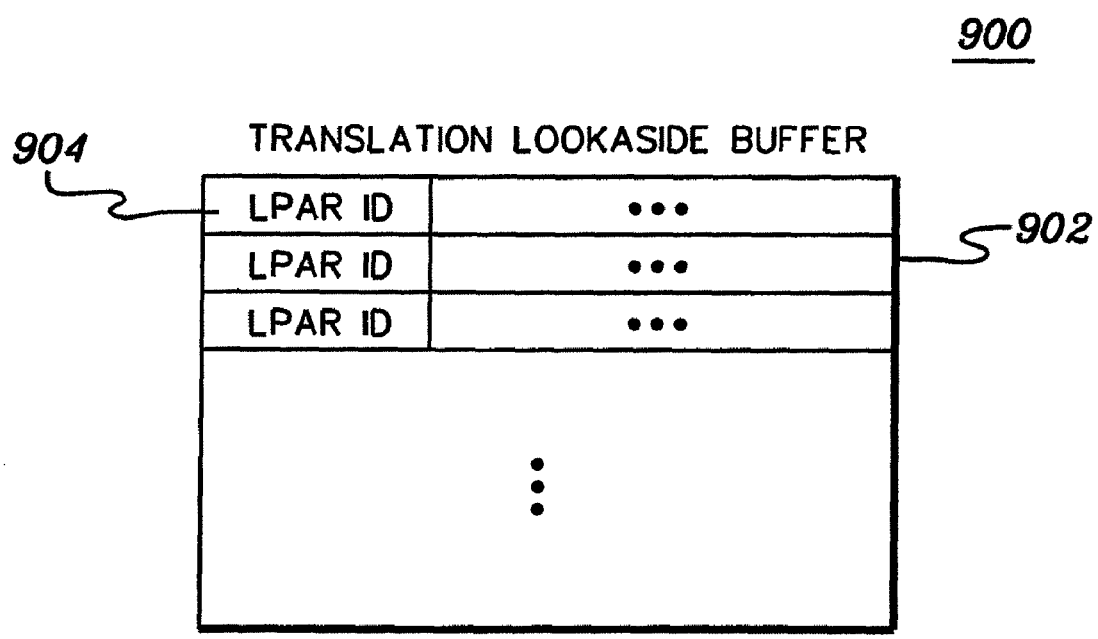
FIG. 9 depicts one example of a Translation Lookaside Buffer, in accordance with an aspect of the present invention.

Referring to FIG. 9, a Translation Lookaside Buffer 900 includes a plurality of entries 902. An entry includes various information, including, for instance, an identifier 904, such as a logical partition identifier. This identifier indicates which logical partition created the entry, and is used in the processing for that entry, as described with reference to FIG. 10.

Figure 10:
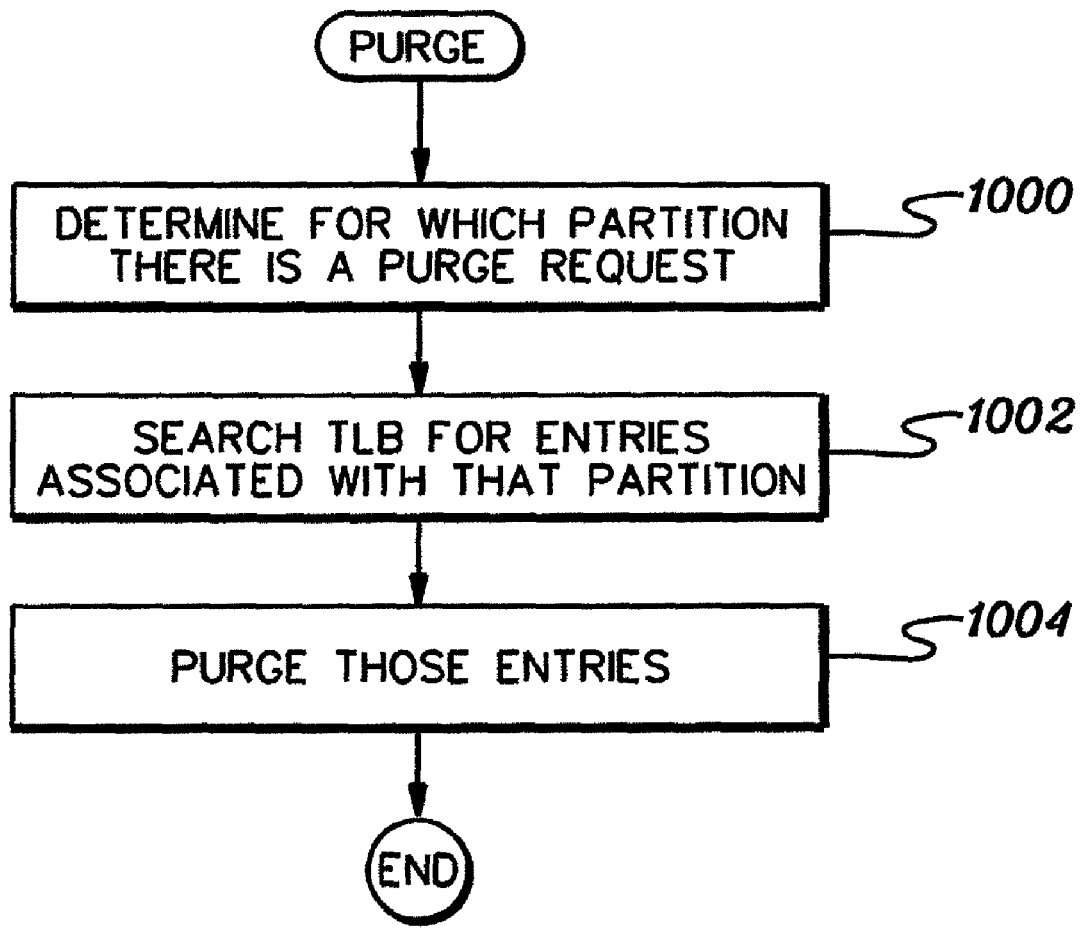
FIG. 10 depicts one embodiment of the logic associated with purging entries of the Translation Lookaside Buffer of FIG. 9, in accordance with an aspect of the present invention.

One embodiment of the logic associated with purging entries from a buffer, such as a Translation Lookaside Buffer, is described with reference to FIG. 10. In one example, a processor that is to purge entries initially determines the partition for which there is a purge request, STEP 1000. In one example, this determination is made by checking the logical partition identifier associated with the request. Subsequent to determining the partition for which there is a purge request, the Translation Lookaside Buffer is searched for entries associated with that partition, STEP 1002. Those entries are then purged, STEP 1004.

Thus, in accordance with an aspect of the present invention, the number of entries to be purged is significantly reduced, since only purge requests that are for the same partition need to cause those entries to be purged. Further, this reduces the need for re-translations, and hence, increases performance.

In addition to the above, by having an identifier tag associated with an entry in a buffer, other improvements are realized. These include, for instance:

1. It is possible to keep the entries for several different LPARs in a TLB at one time. When looking up an entry for a hit during normal instruction execution, the entries where the LPAR identifier matches the currently active partition are considered for a hit. Even if the addresses match, but the LPAR identifier does not match, then it is treated as a TLB miss.
2. A Purge TLB instruction (PTLB) is enhanced to purge those entries in the TLB that were formed by the currently active LPAR. This PTLB instruction is a local purge type instruction that does not need to be broadcast to all processors.
3. On a broadcast CSP instruction, entries, in which the LPAR identifier stored in the TLB and the LPAR identifier of the quiesce master match, are purged. Similarly, limited purges are implemented for broadcast IPTE and broadcast SSKE operations.
4. When the LPAR hypervisor starts a different LPAR on a given physical processor compared to the last LPAR that executed on that physical processor, there is no need to purge all entries from the TLB on that processor.

Described in detail above are capabilities for improving performance of computing environments. This performance enhancement can be seen in many environments, including large SMP environments that are partitioned (or environments with separate zones). For instance, one or more capabilities of the present invention improve on system performance, as follows. Previously for a 16-way SMP system, 10% of all time could be spent on quiescing the system and being stalled waiting for blk_xlat to drop. This performance degradation would increase at a rate roughly proportional to the square of the number of processors in an SMP system. This is significantly reduced by using one or more aspects of the present invention.

Although a logically partitioned environment is described herein, this is only one example. Aspects of the invention are beneficial to many types of environments, including other environments that have a plurality of zones and non-partitioned environments. Further, there may be no central processor complexes, but yet, multiple processors coupled together. Yet further, although a particular environment is described herein, many variations to this environment can be implemented without departing from the spirit of the present invention. For example, if the environment is logically partitioned, then more or less logical partitions may be included in the environment. Further, there may be multiple central processing complexes coupled together. Yet further, there could be more than one controller. These are only some of the variations that can be made without departing from the spirit of the present invention. Additionally, other variations are possible. For example, although the controller described herein serializes the instructions so that one broadcast instruction executes at one time, in another embodiment, multiple instructions may execute at one time.

Advantageously, one or more aspects of the present invention can be used to increase performance, along with one or more aspects of one or more other inventions, which are described in U.S. Pat. No. 7,020,761, entitled "Blocking Processing Restrictions Based On Page Indices," Slegel et al., (IBM Docket No. POU920030048US1), issued Mar. 28, 2006; and U.S. Pat. No. 6,996,698, entitled "Blocking Processing Restrictions Based On Addresses," Slegel et al., (IBM Docket No. POU920030049US1), issued Feb. 7, 2006, each of which is hereby incorporated herein by reference in its entirety. U.S. Pat. No. 7,284,100, entitled "Invalidating Storage, Clearing Buffer Entries, And An Instruction Therefor," Slegel et al., (IBM Docket No. POU920030050US1), issued Oct. 16, 2007, is also hereby incorporated herein by reference in its entirety.

As used herein, the term "processing unit" includes processors; emulators; and/or other similar components. The term "by a processing unit" also includes on behalf of a processing unit. Moreover, an "identifier of a request" also includes an identifier associated with a request. Further, "obtaining" includes, but is not limited to, having, selecting, being provided, looking up, etc. Yet further, the term "buffer"

includes an area of storage, as well as different types of data structures, including, but not limited to, arrays. Further, although the term "table" is used herein, this term is to cover various other data structures. The terms, buffer and table, are not meant to be limiting to specific types of data structures.

The capabilities of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. As a particular example, various inquiries used in determining whether to block a request may be eliminated or changed. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for processing requests of a logically partitioned computer system comprising a plurality of logical partitions, the computer program product comprising:
a storage medium readable by a processor and storing instructions for execution by the processor for performing a method comprising:
obtaining by a receiving processing unit of the logically partitioned computer system a request of a sending processing unit of the logically partitioned computer system, said sending processing unit being associated with one logical partition of the logically partitioned computer system and the request including a logical partition identifier of the one logical partition, and the receiving processing unit being in the one logical partition or another logical partition of the logically partitioned computer system;
determining whether the request is to be blocked by the receiving processing unit, wherein the determining comprises comparing the logical partition identifier of the request with a logical partition identifier of the receiving processing unit; and
blocking processing of the request by the receiving processing unit, in response to the comparing indicating a mismatch between the logical partition identifier of the request and the logical partition identifier of the receiving processing unit, wherein a mismatch indicates that the sending processing unit and the receiving processing unit are in different logical partitions, and wherein the blocking comprises providing by the receiving processing unit to a controller an indication that the receiving processing unit has reached a processing point associated with the request even though the receiving processing unit does not perform the request, and wherein the request is a quiesce request associated with a purge operation, and wherein the purge operation is associated with one or more of the following instructions:
an instruction to invalidate one or more page table entries;
an instruction to set one or more storage keys; and
an instruction to perform at least one compare and swap in storage and to purge one or more entries.

2. The computer program product of claim 1, wherein the determining further comprises deciding whether the sending processing unit is operating in hypervisor mode, wherein the determining indicates that the request can be blocked, in response to the deciding indicating that the sending processing unit is not operating in hypervisor mode.

3. The computer program product of claim 1, wherein the processing point comprises a quiesce point, and wherein the blocking processing of the quiesce request by the receiving processing unit comprises the receiving processing unit not quiescing.

4. The computer program product of claim 1, wherein the method further comprises purging, by the receiving processing unit, one or more entries of one or more buffers corresponding to the purge operation, wherein the purging is performed at a time selected by the receiving processing unit.

5. The computer program product of claim 4, wherein the purging comprises selecting by the receiving processing unit the one or more entries to be purged, the selecting of an entry of the one or more entries being based on an identifier associated with the entry.

6. The computer program product of claim 5, wherein the selecting of the entry comprises:
comparing an identifier of the entry with an identifier of the request; and
selecting the entry, in response to a match of the identifier of the entry with the identifier of the request.

7. The computer program product of claim 6, wherein the identifier of the entry comprises a logical partition identifier of the logical partition associated with that entry.

8. The computer program product of claim 1, wherein the blocking comprises ignoring an indication prohibiting dynamic address translation, wherein dynamic address translation is performed.

9. A computer system for processing requests of a logically partitioned system comprising a plurality of logical partitions, the computer system comprising:
a memory; and
a processor in communications with the memory, wherein the computer system is capable of performing a method, said method comprising:
obtaining by a receiving processing unit of the logically partitioned system a request of a sending processing unit of the logically partitioned system, said sending processing unit being associated with one logical partition of the logically partitioned system and the request including a logical partition identifier of the one logical partition, and the receiving processing unit being in the one logical partition or another logical partition of the logically partitioned system;
determining whether the request is to be blocked by the receiving processing unit, wherein the determining comprises comparing the logical partition identifier of the request with a logical partition identifier of the receiving processing unit; and blocking processing of the request by the receiving processing unit, in response to the comparing indicating a mismatch between the logical partition identifier of the request and the logical partition identifier of the receiving processing unit, wherein a mismatch indicates that the sending processing unit and the receiving processing unit are in different logical partitions, and wherein the blocking comprises providing by the receiving processing unit to a controller an indication that the receiving processing unit has reached a processing point associated with the request even though the receiving processing unit does not perform the request, and wherein the request is a quiesce request associated with a purge operation, and wherein the purge operation is associated with one or more of the following instructions:
an instruction to invalidate one or more page table entries;
an instruction to set one or more storage keys; and
an instruction to perform at least one compare and swap in storage and to purge one or more entries.

10. The computer system of claim 9, wherein the determining further comprises deciding whether the sending processing unit is operating in hypervisor mode, wherein the determining indicates that the request can be blocked, in response to the deciding indicating that the sending processing unit is not operating in hypervisor mode.

11. The computer system of claim 9, wherein the processing point comprises a quiesce point, and wherein the blocking processing of the quiesce request by the receiving processing unit comprises the receiving processing unit not quiescing.

12. The computer system of claim 9, wherein the method further comprises purging, by the receiving processing unit, one or more entries of one or more buffers corresponding to the purge operation, wherein the purging is performed at a time selected by the receiving processing unit.

13. The computer system of claim 12, wherein the purging comprises selecting by the receiving processing unit the one or more entries to be purged, the selecting of an entry of the one or more entries being based on an identifier associated with the entry.

14. The computer system of claim 13, wherein the selecting of the entry comprises:
comparing an identifier of the entry with an identifier of the request; and
selecting the entry, in response to a match of the identifier of the entry with the identifier of the request.

15. A method of processing requests of a logically partitioned computer system comprising a plurality of logical partitions, said method comprising:
obtaining by a receiving processing unit of the logically partitioned computer system a request of a sending processing unit of the logically partitioned computer system, said sending processing unit being associated with one logical partition of the logically partitioned computer system and the request including a logical partition identifier of the one logical partition, and the receiving processing unit being in the one logical partition or another logical partition of the logically partitioned computer system;
determining whether the request is to be blocked by the receiving processing unit, wherein the determining comprises comparing the logical partition identifier of the request with a logical partition identifier of the receiving processing unit; and
blocking processing of the request by the receiving processing unit, in response to the comparing indicating a mismatch between the logical partition identifier of the request and the logical partition identifier of the receiving processing unit, wherein a mismatch indicates that the sending processing unit and the receiving processing unit are in different logical partitions, and wherein the blocking comprises providing by the receiving processing unit to a controller an indication that the receiving processing unit has reached a processing point associated with the request even though the receiving processing unit does not perform the request, and wherein the request is a quiesce request associated with a purge operation, and wherein the purge operation is associated with one or more of the following instructions:
an instruction to invalidate one or more page table entries;
an instruction to set one or more storage keys; and
an instruction to perform at least one compare and swap in storage and to purge one or more entries.

16. The method of claim 15, wherein the determining further comprises deciding whether the sending processing unit is operating in hypervisor mode, wherein the determining indicates that the request can be blocked, in response to the deciding indicating that the sending processing unit is not operating in hypervisor mode.

17. The method of claim 15, wherein the processing point comprises a quiesce point, and wherein the blocking processing of the quiesce request by the receiving processing unit comprises the receiving processing unit not quiescing.

18. A computer program product for processing requests of a logically partitioned computer system comprising a plurality of logical partitions, the computer program product comprising:
a storage medium readable by a processor and storing instructions for execution by the processor for performing a method comprising:
obtaining, by a receiving processing unit of the logically partitioned computer system, a purge request to purge at least one entry of a translation lookaside buffer, the purge request including a specified logical partition identifier, and wherein the translation lookaside buffer comprises a plurality of entries, each entry including a logical partition identifier, wherein the logical partition identifier in one entry of the translation lookaside buffer may be the same or different from the logical partition identifier in another entry of the translation lookaside buffer;
determining which entries of the translation lookaside buffer have a logical partition identifier equal to the specified logical partition identifier of the request; and
purging, by the receiving processing unit, the entries of the translation lookaside buffer having a logical partition identifier equal to the specified logical partition identifier, wherein, in response to the purging, an entry is not purged but remains in the translation lookaside buffer because of a mismatch of the specified logical partition identifier and the logical partition identifier of the entry.

19. The computer program product of claim 18, wherein the purge request comprises an instruction to purge all entries of the translation lookaside buffer, but the entry having a mismatched identifier is not purged.

20. The computer program product of claim 18, wherein the specified logical partition in the purge request is different from a logical partition identifier of the receiving processing unit.

21. A computer system for processing requests of a logically partitioned system comprising a plurality of logical partitions, the computer system comprising:
a memory; and
a processor in communications with the memory, wherein the computer system is capable of performing a method, said method comprising:

obtaining, by a receiving processing unit of the logically partitioned system, a purge request to purge at least one entry of a translation lookaside buffer, the purge request including a specified logical partition identifier, and wherein the translation lookaside buffer comprises a plurality of entries, each entry including a logical partition identifier, wherein the logical partition identifier in one entry of the translation lookaside buffer may be the same or different from the logical partition identifier in another entry of the translation lookaside buffer;

determining which entries of the translation lookaside buffer have a logical partition identifier equal to the specified logical partition identifier of the request; and purging, by the receiving processing unit, the entries of the translation lookaside buffer having a logical partition identifier equal to the specified logical partition identifier, wherein, in response to the purging, an entry is not purged but remains in the translation lookaside buffer because of a mismatch of the specified logical partition identifier and the logical partition identifier of the entry.

22. The computer system of claim 21, wherein the purge request comprises an instruction to purge all entries of the translation lookaside buffer, but the entry having a mismatched identifier is not purged.

23. The computer system of claim 21, wherein the specified logical partition in the purge request is different from a logical partition identifier of the receiving processing unit.

* * * * *